United States Patent [19]

Yokokura et al.

[11] 4,273,834
[45] Jun. 16, 1981

[54] MASKING OF ABRASION INJURY ON GLASS ARTICLES

[75] Inventors: Shuichi Yokokura; Yu Horie, both of Takasaki; Minoru Takamizawa, Annaka; Yoshio Inoue, Annaka; Hiroshi Yoshioka, Annaka, all of Japan

[73] Assignees: Kirin Beer Kabushiki Kaisha; Shin-Etsu Kagako Kogyo Kabushiki Kaisha, both of Tokyo, Japan

[21] Appl. No.: 83,125

[22] Filed: Oct. 9, 1979

[30] Foreign Application Priority Data

Oct. 14, 1978 [JP] Japan ................... 53-126590

[51] Int. Cl.³ ............................... B32B 17/10
[52] U.S. Cl. ................... 428/429; 206/524.3; 215/DIG. 6; 260/33.4 SB; 427/140; 427/154; 427/269; 427/387; 427/389.7; 427/443.2; 428/35; 528/17; 528/43; 427/140;165;167;168;169;302;389.7;407.2;387;- 154;260;269;421;429;443.2
[58] Field of Search .......................... 528/17, 43; 260/33.4 SB, 33.6 SB, 29.1 SB; 106/287.16, 282.17; 428/35, 63, 429, 447; 206/524.3; 215/DIG. 6, 12 R

[56] References Cited

U.S. PATENT DOCUMENTS

| | | | |
|---|---|---|---|
| 3,705,205 | 12/1972 | Antonen | 528/43 |
| 3,725,105 | 4/1973 | Chase | 427/140 |
| 3,801,522 | 4/1974 | Vasta | 528/43 |
| 4,056,208 | 11/1977 | Prejean | 427/407.2 X |
| 4,059,473 | 11/1977 | Okami | 428/429 X |
| 4,163,082 | 7/1979 | Romenesko | 428/447 |

FOREIGN PATENT DOCUMENTS 49-9673  4/1974 Japan .
52-90516 7/1977 Japan .
53-98320 8/1978 Japan .

*Primary Examiner*—Ronald H. Smith
*Assistant Examiner*—Thurman K. Page
*Attorney, Agent, or Firm*—Ladas & Parry

[57] ABSTRACT

A scuff-masking composition for glass vessels comprises a specific organopolysiloxane and a curing catalyst therefor, and is highly effective in a method of masking scuffs on glass vessels, which comprises providing the composition on the scuffs and curing the coated composition.

5 Claims, No Drawings

MASKING OF ABRASION INJURY ON GLASS ARTICLES

BACKGROUND OF THE INVENTION

This invention relates to the masking of abrasion injury such as marks due to grazing, scratching, galling, scoring, and like abrasive action (hereinafter referred to collectively as "scuffs") on glass articles, particularly glass vessels, especially returnable glass vessels.

The glass vessels which are used for beer, refreshing beverages, milk and the like in some countries are generally returnable, and are recovered after use from the market and reused. The glass vessels such as bottles which are to be recovered and reused repeatedly come into contact with each other or, for example, with metallic articles, in the course of bottling processes or transportation, whereby scuffs are left on the surfaces of the glass vessels. As a result, the appearance of the glass vessels is markedly impaired, and the commodity value of the resulting bottled beverages is lowered.

Accordingly, it has been considered to coat a masking agent onto the scuffed parts on the surfaces of glass vessels to mask such scuffs. Some masking agents have been proposed but are not fully satisfactory as far as we are aware.

The reason for this is that a scuff-masking agent for the above mentioned purpose must simultaneously satisfy several requirements, but the known masking agents are not satisfactory in this respect.

In general, a coat film provided on the scuffed parts of a glass vessel must satisfy the following requirements. (1) The film must have good scuff-masking property. (2) It must have good water resistance. (3) It must have no surface tackiness. (4) The required properties such as hardness and strength of the film must be exhibited at temperatures in the vicinity of room temperature. (5) The masking material itself must not be toxic, and a solvent, if used, must not be toxic. (6) The films must be readily and completely removable by washing with an alkaline solution in a bottle-washing step or the like.

First of all, this film must, of course, have good scuff-masking property, but it also must have good water resistance. The glass vessels filled with beer, refreshing beverages and the like are often immersed in chilled water contained in a show-case or tank in summer. Thus, the coat film provided on a glass vessel is required to have high water resistance such that the film is not removed even when the vessel is immersed in water for several weeks. Moreover, such glass vessels are generally handled with bare hands. When surfaces of the film of the glass vessels are tacky, the handlers experience an unpleasant sensation, and the film surface may be contaminated with dust from the atmosphere. On the other hand, in the case where heating is necessary to have the coated films cured or crosslinked to obtain the properties required for the masking films such as hardness and strength, there is the risk of deterioration of the contents contained in the vessels since the coating with scuff-masking agent is normally carried out after the vessels are filled with the contents, because scuffs are sometimes produced in the filling step. This situation is the same as that in the case where irradiation with light rays is employed instead of heating.

Since such glass vessels accommodate foodstuffs, the coat film materials must be nonpoisonous and odorless, and a solvent to be used when a coat film is formed from a solution must also be nonpoisonous (this being also required from the point of view of the working environment). Thus, organic solvents other than alcohols should not be used. In other words, the film materials themselves or the precursors thereof should be soluble in alcohols, especially in ethanol.

Another important property required of the film is that it must have good removability in a bottle-washing step with an alkaline solution. In general, such glass vessels are collected and are then subjected to washing and sterilization in a bottle-washing machine with an alkaline solution, wherein, ordinarily, aqueous sodium hydroxide of about 2 to about 4% concentration is used and the operation is carried out for about 10 to about 20 minutes at a temperature of 60° to 80° C., the glass vessels thus washed being then reused. If the coat films are not completely stripped by the alkaline solution of the bottle-washing machine, and some parts thereof remain on the glass surfaces, the scuff-masking agent will be again put on the resulting uneven surfaces, whereby the aesthetic appearance of the coated surfaces will be impaired.

In this connection, a method of masking scuffs which comprises establishing strong films (permanent films) which cannot be removed with an alkaline solution on the scuffed surfaces of glass vessels has been proposed. However, since the glass vessels are repeatedly collected and reused, it is difficult to prevent scuffs from being produced on the permanent films themselves. Furthermore, when the vessels are repeatedly washed with an alkaline solution, the appearance of the films is apt to deteriorate. That is, the films may become white-opaque, for example. Moreover, a thicker film ($50\mu$ or more) is generally required to obtain such a permanent film, which entails a cost problem. To the best of our knowledge at present, the method of using permanent films is not practicable.

As mentioned above, there have been proposed several scuff-masking agents. In addition, variety of coating materials including scuff-preventing agents and breakage-preventing agents are known. All of these agents do not completely satisfy the above enumerated requirements. For example, (1) Surfactants have poor water resistance. When surfactants having an hydrophile-lipophile balance (HLB) of 9 or more are used, the resulting coat films are removed when immersed in water for about 4 to 5 hours. Generally, surfactants result in greater tackiness. (2) Liquid paraffins have very poor water resistance. In the case of solid paraffins (having melting points of 42° C. or higher), the resulting coat films have good removability in a bottle washing operation. The stripped material, however, floats as scum on the surface of the alkaline solution in the bottle-washing machine and is redeposited on the glass surfaces to interfere with the bottle-washing operation. (3) Organic high-molecular materials (resins) which are coated in the form of aqueous emulsions result in coat films which have very poor water resistance unless they are treated by heating or irradiation with light rays. When they are provided in the form of solutions dissolved in organic solvents, there exist problems such as poor removability of the resulting dried film with an alkaline solution in a bottle-washing machine and toxicity of the organic solvent used, although the resulting films have good water resistance and absence of surface tackiness. When the high-molecular materials are of the type which requires curing after coating, a considerably high heating temperature is required.

SUMMARY OF THE INVENTION

An object of the invention is to solve the above described problems. This object has been achieved by the use as the scuff-masking agent of a specific and restricted silicone resin.

More specifically the scuff-masking composition for glass vessels according to the present invention comprises the following components A and B:

Component A

An organopolysiloxane represented by the following average compositional formula, $$(C_6H_5)_x \cdot (CH_3)_y \cdot (OR)_z \cdot SiO_{[4-(x+y+z)/2]}$$

wherein R is an alkyl group having 1 to 4 carbon atoms, and x, y and z are numbers having the following relationship, $1 \leq x+y < 2$ $1 \leq y/x < 10$ $0.4 \leq z < 2$; and

Component B

A curing catalyst for the component A.

According to this invention in another aspect thereof, there is also provided a method of masking the scuffs on glass vessels which comprises providing the following organopolysiloxane composition on the scuffed parts of the glass vessels and curing the composition, the composition comprising the following components A and B:

Component A

An organopolysiloxane represented by the following average compositional formula, $$(C_6H_5)_x \cdot (CH_3)_y \cdot (OR)_z \cdot SiO_{[4-(x+y+z)/2]}$$

wherein R is an alkyl group having 1 to 4 carbon atoms, and x, y and z are numbers having the following relationship, $1 \leq x+y < 2$ $1 < y/x < 10$ $0.4 \leq z < 2$; and

Component B

A curing catalyst for the component A.

In accordance with the steps of coating and curing the specific organopolysiloxane, it is possible to use ethanol as a solvent (if required) and to form at room temperature a coat film having the required properties, and the resulting film has excellent scuff-masking property and water resistance, and has no surface tackiness, while exhibiting good removability when the returned vessels are alkali-washed in a bottle-washing machine.

DETAILED DESCRIPTION OF THE INVENTION

1. Glass Vessels to Be Treated

The present invention can be applied to any glass vessel which has been recovered from the market and can be reused, such as the glass bottles for beer, refreshing beverages, milk, etc.

The term "glass vessel" is used herein irrespectively of whether or not it is filled with contents. Since the method of the present invention does not require heating or irradiation with light rays, the advantage of the present invention will be best exhibited when glass vessels filled with their contents are treated.

Throughout this disclosure, quantities expressed in "parts" and "percent" are by weight.

2. Organopolysiloxane Compositions (1) Organopolysiloxane (Component A)

The organopolysiloxane to be used in the present invention is represented by the following average compositional formula;

$$(C_6H_5)_x \cdot (CH_3)_y \cdot (OR)_z \cdot SiO_{[4-(x+y+z)/2]}$$

wherein, R in the alkoxy group is a $C_1$ to $C_4$ alkyl group such as a methyl, ethyl, n- or i- propyl, or n-, i- or t-butyl group. An ethyl group is most preferred from the viewpoint of curing property and toxicity. x, y and z are numbers having the following relationship, $1 \leq x+y < 2$ $1 < y/x < 10$ $0.4 \leq z < 2$.

The restriction of x, y and z is significant from the viewpoint of the scuff-masking of the glass vessels. When the sum $x+y$ is less than 1, cracks are apt to be formed in the resulting cured films, and the composition blended with a curing catalyst exhibits poor storing stability. When the sum is greater than 2, it becomes difficult to obtain good cured films. When the ratio y/x is 1 or less, the resulting cured film exhibits poor decomposability in an alkaline washing solution, while the scuff-masking effect becomes inferior when the ratio is 10 or more. When the ratio y/x, which is the ratio of the quantity of methyl group to the quantity of phenyl group, is too large (more than 10), it is considered that the masking effect is lowered possibly because the refractive index of the resulting film is decreased and the difference between the refractive index of glass and that of the cured film is increased. When the number z, which indicates the quantity of the group RO, is less than 0.4, the curing velocity of the composition is too slow to be practicable. When z is 2 or more, the resulting cured film is likely to have cracks, and the composition blended with a curing agent has poor storing stability. Incidentally, the RO groups may be converted partly to hydroxyl groups in the course of preparation. There is no problem, however, when the quantity of the resulting compound having hydroxyl groups is within 1% of the organopolysiloxane.

Such organopolysiloxanes can readily be obtained by way of conventional or appropriate processes. Examples of such processes are: (1) a process comprising partial hydrolysis of a member selected from methyltrialkoxysilanes, dimethyldialkoxysilanes, trimethylalkoxysilanes, tetraalkoxysilanes, phenyltrialkoxysilanes, diphenyldialkoxysilanes, methylphenyldialkoxysilanes, dimethylphenylalkoxysilanes, methyldiphenylalkoxysilanes and mixtures thereof; (2) a process comprising partial hydrolysis-alkoxylation by reaction of water, alcohol and the chlorosilanes corresponding to the above-mentioned alkoxysilanes; and (3) a process comprising condensation with elimination of an alkylchloride of (A) the above-mentioned alkoxysilanes, the partial hydrolyzates, polysilicates or mixtures thereof with (B) the chlorosilanes corresponding to the alkoxysilanes or (C) hydrolyzates of the chlorosilanes.

The viscosity of an organopolysiloxane to be used in the present invention is of the order of 60 to 10,000 centistokes at 25° C.

(2) Curing catalyst (Component B)

The catalysts which are known as condensation-curing catalysts for organopolysiloxanes can, in general, be used in the present invention.

More specifically, examples of such curing catalysts are: (1) organic amines such as triethanolamine; (2) metal salts of carboxylic acids such as zinc octanoate and tin octanoate; (3) organotin compounds such as dibutyltin dilaurate and dibutyltin dioctanoate; (4) titanates such as tetrabutyl titanate and tetrapropyl titanate; (5) aluminium organic compounds such as acetylacetone aluminium salt; and (6) boron fluoride complexes such as boron trifluoride triethylamine complex. From the viewpoint of safety and hygiene, dibutyltin dilaurate and tetrabutyl titanate are preferred.

A suitable quantity in which the catalyst is used is of the order of 0.05 to 10 parts, preferably 0.1 to 5 parts per 100 parts of the organopolysiloxane.

(3) Type of the Composition

Each of the organopolysiloxane compositions to be used in the present invention comprises the above mentioned components. More specifically, the compositions may consist essentially of these components and may also contain in addition thereto a variety of auxiliary components such as, for example, dispersion media, stabilizers, thixotropic agents, coloring agents, fillers, compatible polymers.

When organic solvents are used to prepare solutions or dispersions, ethanol is preferred from the viewpoint of safety and hygiene. If circumstances permit, however, other alcohols and especially lower alcohols such as methanol, propanol and butanol, or other organic solvents having the desired dissolving ability can be used.

3. Coating of Glass Vessels

The coating of glass vessels with such organopolysiloxane compositions can be carried out by any appropriate conventional method such as, for example, the dipping method, spraying method, brushing method, flow-coater method, or transfer coating method.

The composition is generally put on the scuffed parts, but the coating area is not restricted to only the scuffed parts.

After the coating, the coated glass vessels are allowed to stand at room temperature for a period of the order of 0.5 to 5 hours, whereupon cured films having no surface tackiness are formed on the glass vessels. It is permissible, however, to heat the coated vessels in order, for example, to shorten the curing time and to remove the solvents used provided that the temperature does not impair the contents in the vessels (for example, at about 50° C.).

The thickness of the cured films can be suitably selected. The efficacy and utility of the present invention can be best exhibited when the cured films are relatively thin. Thus, the suitable thickness of the coat films is generally 0.5 to 10 μm, preferably 1 to 3 μm. The scuff-masking property will become insufficient if the films are thinner than 0.1 μm. When the films are thicker than 10 μm, the removability of the film with an alkaline solution upon washing bottles becomes insufficient.

4. Experiments

REFERENCE EXAMPLE 1

Preparation of alkoxy group-containing organopolysiloxane.

A reactor equipped with a stirrer, a thermometer, a reflux condenser and a dropping funnel is charged with 1,602 grams (g.) of methyltriethoxysilane (9 mols) and 272 g. of diphenyldiethoxysilane (1 mol). The mixture is heated to 80° C., and 144 g of an aqueous solution containing 0.1% by weight of sulfuric acid is added dropwise thereto with stirring. Reaction is continued for another 3 hours at this temperature. The reacted product is then heated to 180° C., while the distillate (ethanol and unreacted silane produced) is distilled away through a distillation column.

Thus, in an actual instance, an alkoxy group-containing organopolysiloxane was obtained in a yield of 1,198 g, which had a viscosity of 128 centistokes (at 25° C.), a content of ethoxy groups of 30.2%, and a refractive index of 1.442.

The resulting product is an organopolysiloxane represented by the following average compositional formula.

$(C_6H_5)_{0.2} \cdot (CH_3)_{0.9} \cdot (OC_2H_5)_{1.3} \cdot Si \cdot O_{0.8}$

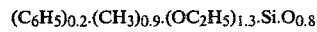

$x+y=1.1, y/x=4.5, z=1.3$

EXAMPLES 1 THROUGH 6 AND COMPARISON EXAMPLES 1 THROUGH 4

The compositions containing the components shown in Table 1 were provided with a brush on the surfaces of beer bottles parts of which were whitened by scuffs, the coating being controlled to form coat films of about 3-μm thickness. The coated bottles were allowed to stand for 3 days at room temperature to cure the coat films. The properties of the resulting films were measured, whereupon the results shown in Table 1 were obtained.

COMPARISON EXAMPLES 5 THROUGH 12

Various scuff-masking agents were provided on the surfaces of beer bottles parts of which were whitened by scuffs. The properties of the resulting films were measured, whereupon the results shown in Table 2 were obtained.

The properties of the coat films were measured in the following manner.

(1) Appearance and scuff-masking property:
These were observed with the naked eye.

(2) Water resistance:
The coated sample was immersed in water at 25° C. and the immersion time until a part of the coat film was removed was determined. The sample was judged to be "good" when the immersion time was one week or longer and judged to be "poor" when the immersion time was shorter than one week.

(3) Adhesiveness:
This was measured by a cross-cut pressure-sensitive cellophane tape peel test. The adhesiveness was expressed by the number of the cross cuts out of 100 cross cuts which were not peeled by the pressure-sensitive cellophane tape pressed to the cross cuts.

(4) Removability in a bottle-washing machine:

The coated bottles were immersed in an aqueous solution containing 3.5% of sodium hydroxide at 70° C., for ten minutes. Appearance or removability of the films applied on the bottles was observed.

(5) Tackiness:

The coated surface of each bottle was then caused to undergo one rotation on carborundum powder of 60 mesh size. The quantity of carborundum then adhering to the bottle was measured, and this quantity per $cm^2$ of the coated surface was calculated. The tackiness of uncoated glass surface was 0.3 $mg/cm^2$. In this test, the surface is judged to have "no tackiness" when the adhering quantity is 3 $mg/cm^2$ or less.

TABLE 1

| EX. | R | x+y | y/x | z | Curing Catalyst Type | Quantity* | Solvent Type | Quantity* | Appearance | Scuff-masking property | Water resistance | Adhesiveness | Alkali-removability | Tackiness ($mg/cm^2$) |
|---|---|---|---|---|---|---|---|---|---|---|---|---|---|---|
| 1 | $C_2H_5$ | 1.1 | 4.5 | 1.3 | tetrabutyl titanate | 1.0 | ethanol | 200 | good | good | good | 100/100 | good | 0.3 |
| 2 | $CH_3$ | 1.2 | 8.6 | 0.74 | tetrabutyl titanate | 0.5 | none | — | " | " | " | 100/100 | " | " |
| 3 | $C_2H_5$ | 1.3 | 6.4 | 0.55 | dibutylin dilaurate | 0.5 | ethanol | 200 | " | " | " | 100/100 | " | " |
| 4 | $C_3H_7$ | 1.5 | 7.7 | 0.83 | tetrapropyl titanate | 0.5 | isopropanol | 200 | " | " | " | 100/100 | " | " |
| 5 | $C_2H_5$ | 1.6 | 3.0 | 1.55 | tetrabutyl titanate | 1.0 | ethanol | 200 | " | " | " | 100/100 | " | " |
| 6 | $C_2H_5$ | 1.8 | 2.6 | 0.45 | dibutyltin dilaurate | 1.0 | ethanol | 200 | " | " | " | 100/100 | " | " |
| COMPARISON EX. | | | | | | | | | | | | | | |
| 1 | $CH_3$ | 1.2 | 11.0 | 0.74 | tetrabutyl titanate | 0.5 | none | — | " | poor | " | 100/100 | " | " |
| 2 | $C_2H_5$ | 1.1 | 0.8 | 1.3 | tetrabutyl titanate | 1.0 | ethanol | 200 | " | good | " | 100/100 | no removal | " |
| 3 | $CH_3$ | 0.7 | 8.6 | 0.74 | tetrabutyl titanate | 0.5 | ethanol | 200 | cracking | poor | " | 60/100 | good | " |
| 4 | $C_2H_5$ | 2.2 | 5.0 | 0.40 | tetrabutyl titanate | 1.0 | ethanol | 200 | poor curing | good | poor | not measurable | " | 8.5 |

*Parts by weight per 100 parts by weight of organopolysiloxane

TABLE 2

| | Scuff-masking agent | Curing condition | Scuff-masking property | Water resistance | Tackiness ($mg/cm^2$) | Alkali-removability | appearance | Adhesiveness |
|---|---|---|---|---|---|---|---|---|
| Ex. 1 | alkoxy group-containing organopolysiloxane | room temp. × 3 days | good | good | 0.3 | good | good | 100/100 |
| Comp. Ex. 5 | glyceryl monocaprylate | room temp. × 3 days | " | poor | 7.5 | " | poor curing | not measurable |
| Comp. Ex. 6 | polyoxyethylenesorbitan monostearate | room temp. × 3 days | " | " | 8.5 | " | poor curing | not measurable |
| Comp. Ex. 7 | alkyl polyethoxylate | room temp. × 3 days | " | " | 6.0 | " | poor curing | not measurable |
| Comp. Ex. 8 | emulsion of 40% solid paraffin and 60% liquid paraffin | room temp. × 3 days | " | " | 3.6 | " | good | 0/100 |
| Comp. Ex. 9 | polyvinyl acetate emulsion | room temp. ×3 days | fairly good | " | 5.0 | " | " | 0/100 |
| Comp. Ex. 10 | ethylene-vinyl acetate copolymer emulsion | room temp. × 3 days | fairly good | " | 6.2 | " | " | 0/100 |
| Comp. Ex. 11 | solvent type epoxy* (DER 331) | 100° C. × 30 min. | good | good** | 0.3 | poor | " | 0/100 |
| Comp. Ex. 12 | ethylene-vinyl acetate vinyl alcohol copolymers* (Dumilan A-2192) | 200° C. × 10 min. | fairly good | good** | 2.7 | " | " | 100/100 |

*Thermosetting resin
**Primer based on aminosilane used

The scuff-masking composition to be tested was coated onto an area measuring 10 mm (vertical direction)×40 mm (circumferential direction) of a beer bottle of 633-C.C. capacity, the area to be coated being positioned around the body of the bottle with a center 140 mm from the bottom thereof. The coated bottles were allowed to stand for 3 days at room temperature.

What is claimed is:

1. A scuff-masking composition for glass articles which comprises:
   a Component A which is an organopolysiloxane represented by the average compositional formula $$(C_6H_5)_x.(CH_3)_y.(OR)_z.SiO_{[4-(x+y+z)/2]}$$

wherein R is an alkyl group having 1 to 4 carbon atoms, and x, y and z are the numbers having the relationship $1 \leq x+y < 2$ $1 < y/x < 10$ $0.4 \leq z < 2$; and a Component B which is a curing catalyst for the component A; the composition being curable at a temperature up to about 50° C. and the cured product being removable by aqueous alkali.

2. The composition as set forth in claim 1, in which the composition is in the form of an alcohol solution.

3. A method of masking scuffs on glass articles, which comprises coating the scuffed part of the glass article with an organopolysiloxane composition and curing the composition at a temperature up to about 50° C., said composition comprising: a Component A which is an organopolysiloxane represented by the average compositional formula $$(C_6H_5)_x.(CH_3)_y.(OR)_z.SiO_{[4-(x+y+z)/2]}$$

wherein R is an alkyl group having 1 to 4 carbon atoms, and x, y and z are the numbers bearing the relationship $1 \leq x+y < 2$ $1 < y/x < 10$ $0.4 \leq z < 2$; and a Component B which is a curing catalyst for the component A; the composition being curable at a temperature up to about 50° C. and the cured product being removable by aqueous alkali.

4. The method as set forth in claim 3, in which the composition is in the form of an alcohol solution.

5. A glass article which has a coat film on at least a part of its surface thereby masking scuffs on the surface, the film being a cured product of the composition claimed in claim 1 or 2.

* * * * *